Aug. 13, 1968     F. RÜCKERT     3,396,825
CONTINUOUS BRAKE SYSTEM WITH THE AID OF
A HYDRODYNAMIC CIRCULATORY SYSTEM
Filed June 17, 1966
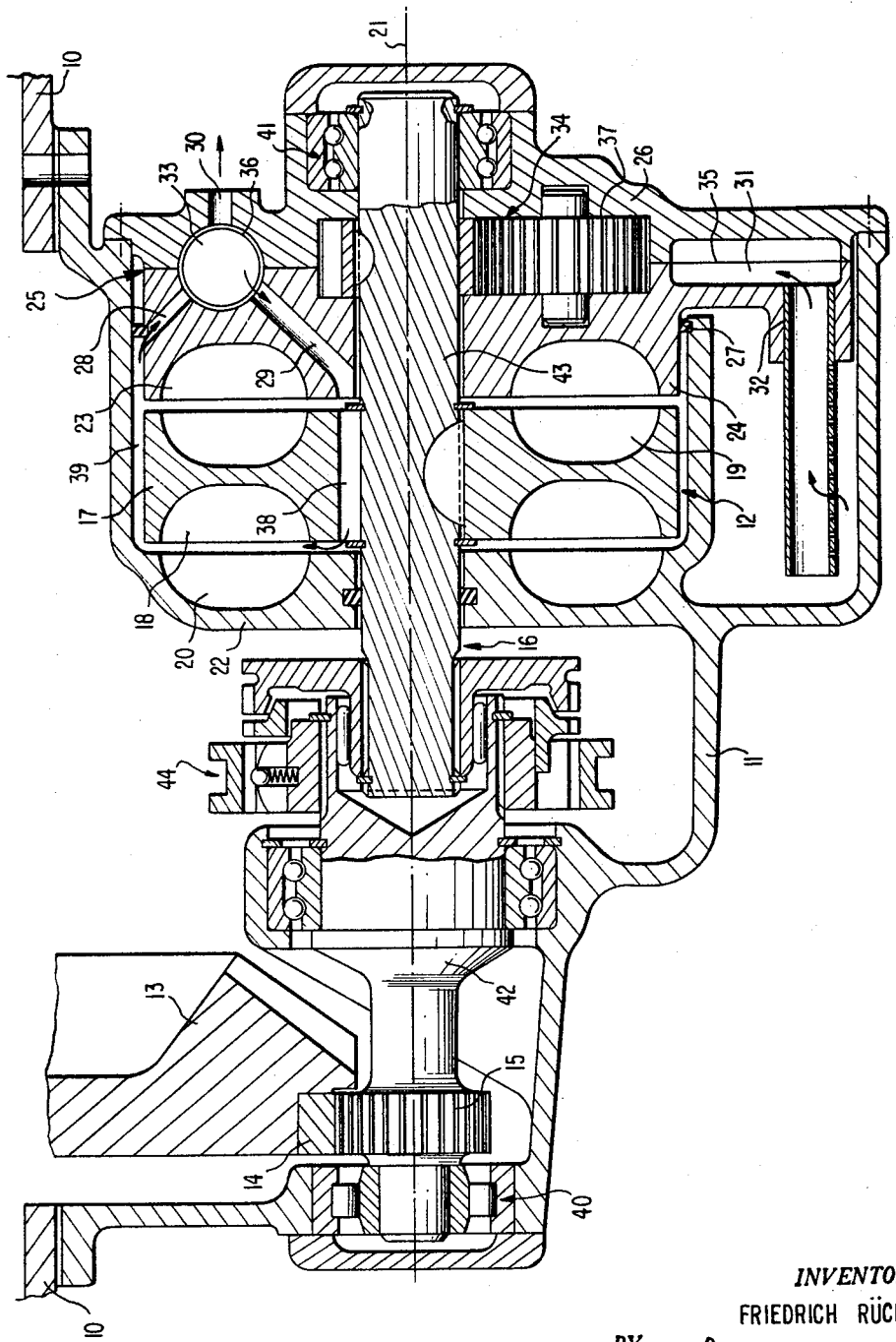
INVENTOR.
FRIEDRICH RÜCKERT
BY *Dicke & Craig*
ATTORNEYS United States Patent Office 3,396,825
Patented Aug. 13, 1968

3,396,825
CONTINUOUS BRAKE SYSTEM WITH THE AID OF A HYDRODYNAMIC CIRCULATORY SYSTEM
Friedrich Rückert, Waiblingen, Germany, assignor to Daimler-Benz Aktiengesellschaft, Stuttgart-Unterturkheim, Germany
Filed June 17, 1966, Ser. No. 558,421
Claims priority, application Germany, June 18, 1965, D 47,535
20 Claims. (Cl. 188—90)

ABSTRACT OF THE DISCLOSURE

A continuous brake system, especially for commercial-type vehicles, in which a gear drive producing a gearing-up ratio, that is an overdrive, is arranged at the axle drive bevel gear or spur bevel gear of a differential assembly preferably associated with an axle, which gear drive is drivingly connected with the pump wheel of a conventional hydrodynamic brake, whose stationary reactor wheel is formed by a sidewall extending radially to the brake axis of the non-rotating brake housing, that is separate from the differential housing, the brake housing being provided with an internal space enclosed by a rigid partition or intermediate wall which accommodates the pump wheel and the stationary reactor wheel formed by the lateral wall, and in which a pump is arranged in the circulatory system of the coupling liquid. The intermediate wall is formed by an inner wall containing the supply and discharge lines for the fluid chamber of the brake and an outer wall with the fluid pump and control valve being arranged in spaces generally bisected by the connecting plane between the inner and outer walls.

Background of the invention

A continuous brake system of the aforementioned type was proposed already in the German patent application D 44,055, filed in the name of the assignee of the present application. With the continuous brake according to the prior proposal, the brake housing is subdivided by the rigid partition or intermediate wall into an inner and an outer space whereby the outer space is closed off by a cover. A scoop shell structure adapted to the circumference of the brake housing and to its rigid partition or intermediate wall is arranged in the inner space of the brake housing, which shell structure is secured at the pump wheel. The brake shaft is constructed hollow for the supply of the brake liquid from the turbine wheel up to its end terminating in the outer space of the brake housing. The working space between pump and stationary reactor wheel is sealed against the brake housing by the rotating scoop shell.

Summary of the invention

In particular, an improvement in the sealing of the working space against the brake housing as well as in the oil supply to the working space and a more advantageous operation and a more simple construction is to be achieved by the present invention with a continuous brake system of the type described hereinabove.

For this purpose, provision is made according to the present invention, that the partition or intermediate wall forming a pressure-tight closure lid or cover for the brake housing is provided with channels for the circulatory system of the brake liquid.

Considerable advantages are achieved by the present invention. The sealing of the working space of the brake can be realized by means of a stationary annular seal between brake housing and the partition or intermediate wall thereof. The coupling shaft constructively limited in its diameter can be of solid construction. Furthermore, the 90-degree deflections of the oil bores necessary in the prior art construction for the conduction of the oil flow out of the brake shaft into the working space and producing disadvantageous line resistances are dispensed with by the present invention. The construction of the brake housing is simplified in an advantageous manner since the outer space formed by the partition or intermediate wall in the prior art construction is no longer present in the construction according to the present invention. Both manufacture and assembly of the brake is also simplified thereby in an advantageous manner. The channels provided according to the present invention in the partition or intermediate wall may be provided in the circumferential direction to the brake axis with a sufficiently large cross section to achieve a flow circulatory system of the brake liquid that is low in flow losses.

According to a further development and feature of the present invention, the partition or intermediate wall may form the housing of the pump for the brake liquid and according to a still further feature of the present invention may accommodate a control slide valve controlling the channels for the brake liquid.

For purposes of an advantageous manufacture of the intermediate wall by casting process, the portion or intermediate wall is subdivided according to still a further development of the present invention into a housing-outer wall portion and a housing-inner wall portion within an abutment or joint plane disposed radially with respect to the brake axis and extending through the pump and control valve space.

The advantage is additionally achieved by the present invention that the braking effect may be increased in a simple manner in that the intermediate wall is constructed on its housing-inner side, i.e., on the side facing the interior of the housing, as stationary reactor wheel and in that the pump wheel is provided with a second pump blading in operative engagement with the reactor wheel of the intermediate wall. Relatively high brake moments may be produced with this arrangement also at relatively low driving velocities without increasing the diameter of the brake housing, limited by the axle gear housing. The axial forces are equalized and thus eliminated at the pump wheel by the second pump wheel blading. A particularly simple and advantageous sealing of the working space of the brake with respect to the brake housing is achieved according to still another feature of the present invention in that an annular seal is arranged between the housing inner wall portion of the partition or intermediate wall and the brake housing.

The structural assembly of the brake housing can be further simplified according to the present invention in that the brake shaft is supported in the housing-outer wall portion of the partition or intermediate wall. In order to avoid the driving losses caused with an emptied coupling by the vortexing or turbulence of air- and residual-oil quantities, the brake shaft according to still a further feature of the present invention may be subdivided outside of the brake housing into a driving shaft stub or section and a brake shaft stub or section whereby the shaft stubs or sections are adapted to be coupled with one another by an engageable clutch.

Accordingly, it is an object of the present invention to provide a continuous brake of the type described above which assures, by extremely simple means, the aforementioned improvements and advantages absent from the prior art constructions.

Another object of the present invention resides in a continuous brake of the type described above which permits the realization of a more advantageous operation and of a more simple construction than could be realized heretofore with the known devices.

A further object of the present invention resides in a continuous brake utilizing a hydrodynamic brake in which the working space thereof can be sealed by means of a simple stationary annular seal that assures long length of life.

Still another object of the present invention resides in a hydrodynamic brake structure for a continuous brake of a motor vehicle in which the brake shaft can be constructed solid while complicated and disadvantageous oil bores producing high flow losses can be avoided and in which the overall construction can be significantly simplified, particularly as regards the housing of the brake.

A still further object of the present invention resides in a continuous brake structure utilizing a hydrodynamic brake which is so constructed and arranged that both manufacture and assembly of the brake is simplified in a significant and advantageous manner while at the same time flow losses in the circulatory system for the hydraulic medium of the brake are minimized.

Another object of the present invention resides in a continuous brake of the type described above which permits an increase in the braking effect, realizable in a simple manner, to achieve a relatively high braking moment even at relatively low velocities and without requiring an increase in the diameter of the brake housing.

Another object of the present invention resides in a continuous brake utilizing a hydrodynamic brake of the type described above in which an equalization of axial forces on the pump wheel is established automatically and possible driving losses caused by eddying of air and residual oil quantities in the hydraulic medium can be avoided.

*Brief description of the drawing*

These and further objects, features and advantages of the present invention will become more obvious from the following description when taken in connection with the accompanying drawing which shows, for purposes of illustration only, one embodiment in accordance to the present invention, and wherein:

The single figure is an axial longitudinal cross-sectional view through a continuous brake in accordance with the present invention.

*Detailed description of the drawing*

Referring now to the drawing, reference numeral 10 indicates a portion of a conventional axle gear housing to which is flangedly connected the housing 11 of a hydrodynamic brake generally designated by reference numeral 12. The spur bevel gear 13 of the axle gear, of conventional construction and therefore not illustrated in detail, is provided along the circumference with radial teeth which are in engagement with the driving gear wheel 15 of the coupling shaft generally designated by reference numeral 16. A pump wheel 17 is arranged non-rotatably on the coupling shaft 16 within the brake housing 11 so as to rotate in unison with the brake shaft 16. The pump wheel 17 is provided with a first pump blading 18 and with a second pump blading 19. The first blading 18 cooperates with a stationary reactor wheel 20 which is constituted by a lateral wall 22 of the brake housing 11 extending radially with respect to the brake axis 21. The second blading 19 of the pump wheel 17, which is arranged symmetrically to the first blading 18, cooperates with a stationary reactor wheel 23 which is constructed unitary with the housing-inner wall portion 24 of a rigid partition or intermediate wall generally designated by reference numeral 25 of the brake housing 11. The partition or intermediate wall 25 forms the closure cover of the brake housing 11 and is provided with a further housing-outer wall portion 26. The working spaces between pump wheel 17 and reactor wheels 20 and 23 are sealed off with respect to the brake housing 11 by means of a stationary ring or annular seal 27 arranged between the housing-inner wall portion 24 of the partition or intermediate wall 25 and the brake housing 11. Channels 28, 29, 30, 31 and 32 are accommodated in the partition or intermediate wall 25 for the circulatory system of the brake liquid. The circulation of the brake liquid is controllable by means of a control valve indicated by reference numeral 33 and of any conventional construction whose housing is constituted by the partition or intermediate wall 25. A gear pump 34 for the brake liquid is furthermore supported in the partition or intermediate wall 25 which is driven by the brake shaft 16. The housing-inner wall portion 24 and the housing-outer wall portion 26 of the partition or intermediate wall 25 are provided with a common joint or abutment plane 35 disposed radially to the brake axis 21 which extends through the control valve space 36 and through the pump space 37. The brake liquid is supplied to the working spaces of the brake from a sump in the bottom of the housing through channels 32 and 31, gear pump 34, control valve 33, channel 29, and channel 38. The brake liquid is discharged from the working spaces of the brake by means of the annular gap 39 between the pump wheel 17 or reactor wheel 23 and the coupling housing 11, fluid channel 28, control valve 33, and fluid channel 30 leading to the sump in the bottom of the coupling housing 11. The control valve 33 regulates the amount of fluid contained within the working spaces of the brake and thus the brake torque by respectively throttling the supply passage between the gear pump 34 and the channel 29, and throttling the discharge passage between the channel 28 and channel 30. Thus, the working spaces of the brake may be selectively filled, drained, or maintained constant at any desired percentage of being completely filled.

The brake shaft 16 is rotatably supported, on the one hand, in the brake housing 11 by a roller bearing generally designated by reference numeral 40 and located at the drive or input side and on the other, in the housing-inner wall portion 26 of the partition or intermediate wall 25 by means of a roller bearing generally designated by reference numeral 41 and located at the brake side.

For purposes of mechanically disconnecting the hydraulic brake, the brake shaft 16 is subdivided, outside of the brake housing 11, into a drive or input shaft stub 42 and into a brake shaft stub 43. Both brake shaft stubs 42 and 43 are adapted to be connected with each other by means of a disengageable clutch generally designated by reference numeral 44 and of any conventional construction.

While I have shown and described one embodiment in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

I claim:

1. A brake system with the aid of a hydrodynamic circulatory system, having pump means for supplying brake filling fluid under pressure especially for commercial-type vehicles, comprising: hydrodynamic brake means including housing means, pump wheel means and stationary reactor wheel means; drive means for driving said pump wheel means; rigid partition wall means forming a pressure-tight closure for the brake housing means and being provided with channel means for a main portion of the circulatory system of the brake liquid; said partition wall means being subdivided into a housing-inner wall portion and a housing-outer wall portion within a joint plane extending through the spaces for the pump means and a control valve for the channel means, said plane being substantially perpendicularly to the axis of the brake means.

2. A brake system according to claim 1, further comprising annular seal means arranged between the inner wall portion of said partition wall means and the brake housing means.

3. A brake according to claim 1, wherein said partition wall means is constructed on the side thereof facing the inside of said housing means as stationary reactor wheel means, and wherein said pump wheel means is provided with a second pump blading cooperating with the reactor wheel means of the partition wall means.

4. A brake according to claim 1, wherein the drive means includes brake shaft means rotatably supported in said wall means.

5. A brake system according to claim 4, wherein the shaft means is subdivided outside of said brake housing means into a driving shaft stub and into a brake shaft stub, and engageable clutch means for connecting said two shaft stubs with each other.

6. A brake system according to claim 11, wherein said housing means is provided with an interior space enclosed by said partition wall means which accommodates the pump wheel means and the stationary reactor wheel means, said drive means includes differential gear means having a spur bevel gear, brake shaft means, and gearing-up transmission means operatively connecting said spur bevel gear with said brake shaft means.

7. A brake system according to claim 6, further comprising annular seal means arranged between the housing-inner wall portion and the brake housing means.

8. A brake system according to claim 7, wherein said partition wall means is constructed on a side facing the interior of the housing means as stationary reactor wheel means, and wherein said pump wheel means is provided with a second pump blading cooperating with the reactor wheel means of the partition wall means.

9. A brake system according to claim 8, wherein the brake shaft means is rotatably supported in the housing-outer wall portion of said wall means.

10. A brake system according to claim 9, wherein said shaft means is subdivided outside of said brake housing means into a driving shaft stub and into a brake shaft stub, and engageable clutch means for connecting said two shaft stubs with each other.

11. A brake system according to claim 1, wherein said wall means forms the housing for the pump means, and further comprising control valve means for said channel means, said partition wall means forming the housing for said control valve means.

12. A brake system according to claim 11, further comprising annular seal means arranged between the housing-inner wall portion and the brake housing means.

13. A brake system according to claim 12, wherein said partition wall means is constructed on a side facing the interior of the housing means as stationary reactor wheel means, and wherein said pump wheel means is provided with a second pump blading cooperating with the reactor wheel means of the partition wall means.

14. A hydrodynamic brake, comprising: a stationary housing; a stationary radial wall defining with said housing a brake working fluid chamber; stationary reactor blades mounted within said chamber; pump blades rotatably mounted within said chamber for cooperation with said reactor blades; said radial wall comprising inner and outer walls, with respect to said chamber, rigidly connected together along connecting surfaces to form therebetween a supply pump chamber; pump means for supplying brake fluid to said fluid chamber under pressure being mounted within said pump chamber and generally bisected by the adjacent connection surfaces of said inner and outer walls.

15. A hydrodynamic brake, comprising: a stationary housing; a stationary radial wall defining with said housing a brake working fluid chamber; stationary reactor blades mounted within said chamber; pump blades rotatably mounted within said chamber for cooperation with said reactor blades; said radial wall comprising inner and outer walls, with respect to said chamber, rigidly connected together along connecting surfaces to form therebetween a filling control valve chamber; valve means for controlling the supply of filling brake fluid to said fluid chamber being mounted within said valve chamber and generally bisected by the adjacent connection surfaces of said inner and outer walls.

16. A hydrodynamic brake according to claim 15, including a generally straight supply channel directly connecting said valve means and said fluid chamber through only said inner wall; a generally straight discharge channel directly connecting said fluid chamber and said valve means through only said inner wall.

17. A hydrodynamic brake according to claim 16, wherein said inner and outer walls form therebetween a supply pump chamber; and further including pump means for supplying brake fluid to said fluid chamber under pressure being mounted within said pump chamber and generally bisected by the adjacent connection surfaces of said inner and outer walls.

18. A hydrodynamic brake according to claim 17, including a source of filling brake fluid, channel means for conducting the brake fluid to said pump means, channel means conducting pressurized brake fluid from said pump means to said valve means.

19. A hydrodynamic brake according to claim 15, wherein said inner and outer walls form therebetween a supply pump chamber; and further including pump means for supplying brake fluid to said fluid chamber under pressure being mounted within said pump chamber and generally bisected by the adjacent connection surfaces of said inner and outer walls.

20. A hydrodynamic brake according to claim 19, including a source of filling brake fluid, channel means for conducting the brake fluid to said pump means, channel means conducting pressurized brake fluid from said pump means to said valve means.

References Cited

UNITED STATES PATENTS

| | | | |
|---|---|---|---|
| 2,385,834 | 10/1945 | Nallinger et al. | 60—54 XR |
| 2,889,013 | 6/1959 | Schneider | 188—90 |
| 2,963,118 | 12/1960 | Booth et al. | 188—90 |
| 3,297,114 | 1/1967 | Erdman et al. | 188—90 |
| 3,334,711 | 8/1967 | Anderson | 188—90 XR |

EDGAR W. GEOGHEGAN, *Primary Examiner.*